(12) United States Patent
Kaplan et al.

(10) Patent No.: US 8,413,054 B2
(45) Date of Patent: Apr. 2, 2013

(54) GRAPHICAL USER INTERFACE FOR STILL IMAGE CAPTURE FROM VIDEO FOOTAGE

(75) Inventors: Jonathan Kaplan, San Francisco, CA (US); David Ben-Yaakov, Castro Valley, CA (US); Jonathan Benjamin Korman, San Francisco, CA (US); Philip C. Kim, South San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 12/422,874

(22) Filed: Apr. 13, 2009

(65) Prior Publication Data
US 2010/0262911 A1 Oct. 14, 2010

(51) Int. Cl.
*G06F 3/00* (2006.01)
(52) U.S. Cl. .................. 715/719; 715/723; 715/724

(58) Field of Classification Search ........... 715/222–723
See application file for complete search history.

(56) References Cited

U.S. PATENT DOCUMENTS

| | | | |
|---|---|---|---|
| 5,760,767 A * | 6/1998 | Shore et al. | 715/723 |
| 6,222,532 B1 * | 4/2001 | Ceccarelli | 715/723 |
| 6,597,375 B1 * | 7/2003 | Yawitz | 715/723 |
| 6,897,880 B2 * | 5/2005 | Samra | 715/862 |
| 2009/0113350 A1 * | 4/2009 | Hibino et al. | 715/853 |

\* cited by examiner

*Primary Examiner* — Weilun Lo
*Assistant Examiner* — Truc Chuong
(74) *Attorney, Agent, or Firm* — Patterson & Sheridan, LLP

(57) ABSTRACT

A graphical user interface includes a first display area configured to display a first image. The first image is associated with a capture time. The graphical user interface also includes a second display area configured to display a second image and a third display area configured to display a third image. The graphical user interface further includes a user input device.

24 Claims, 11 Drawing Sheets

GRAPHICAL USER INTERFACE FOR STILL IMAGE CAPTURE FROM VIDEO FOOTAGE

CROSS-REFERENCES TO RELATED APPLICATIONS

This application is related to co-pending U.S. patent application Ser. No. 12/422,890, filed Apr. 13, 2009. The aforementioned related patent application is hereby incorporated by reference in its entirety.

BACKGROUND OF THE INVENTION

The present invention relates generally to video systems. More specifically, the present invention relates to methods and systems for capturing still images from digital video footage. Merely by way of example, the invention has been applied to a video editing software application running on a personal computer. The methods and techniques can be applied to other applications as well such as video editing software running on a mobile electronic device such as a video camcorder and the like.

Video editing software currently exists that provides a user with a mechanism to transfer video footage from a camcorder to a personal computer and then view the footage on the personal computer. The software provides the functionality of starting and stopping the playback of the video footage. A scroll bar or other type of graphical tool representing a timeline for the video footage is typically used to move to a selected point within the video footage. Some applications offer the ability to move forward or backward by individual frames by selecting frame advance/retreat buttons. When the user reaches the desired frame, the user may capture a still image of the frame, also referred to as a snapshot, from the video footage. A captured image can be stored as an image on the computer's hard drive. The conventional video software may also provide a dialog box that the user can utilize to save the snapshot with a desired file name and/or in a desired folder on the computer.

An example use for a snapshot would be to email highlight pictures from the video. Another use for a snapshot would be to print out the image for display as a traditional photograph suitable for framing. An additional use for a snapshot would be that many digital picture frames can show pictures, but not video. Thus extracting images from video allows a user to then display the extracted images on a medium that would otherwise not accommodate them.

Thus, although conventional video editing software provides the functionality of capturing snapshot images from videos, there exists a need in the art for improved methods and systems for capturing snapshots from video footage.

SUMMARY OF THE INVENTION

According to the present invention, video systems are provided. More specifically, the present invention relates to methods and systems for capturing still images from digital video footage. Merely by way of example, the invention has been applied to a video editing software application running on a personal computer. The methods and techniques can be applied to other applications as well such as video editing software running on a mobile electronic device such as a video camcorder and the like.

According to an embodiment of the present invention, a graphical user interface is provided. The graphical user interface includes a first display area configured to display a first image. The first image is associated with a capture time. The graphical user interface also includes a second display area configured to display a second image, a third display area configured to display a third image, and a user input device.

According to a particular embodiment of the present invention, a graphical user interface is provided. The graphical user interface includes a first display area configured to display a first image. The first image is associated with a capture time. The graphical user interface also includes a second display area configured to display a second image, a third display area configured to display a third image, and a fourth display area configured to display one or more snapshot images. The graphical user interface further includes a user input device.

According to another embodiment of the present invention, a method of providing one or more snapshots extracted from video footage is provided. The method includes displaying a first image in a first display area. The first image is associated with a first capture time. The method also includes displaying a first plurality of preview images in a second display area. The first plurality of preview images are associated with times prior to the first capture time. The method further includes displaying a second plurality of preview images in a third display area. The second plurality of preview images are associated with times subsequent to the first capture time. Moreover, The method includes selecting at least one of the first image, one of the first plurality of preview images, or one of the second plurality of preview images, and saving the selected image to a memory.

According to yet another embodiment of the present invention, a computer-readable storage medium storing a plurality of instructions for controlling a data processor to provide one or more snapshots extracted from video footage is provided. The plurality of instructions include instructions that cause the data processor to display a first image in a first display area. The first image is associated with a first capture time. The plurality of instructions also include instructions that cause the data processor to display a first plurality of preview images in a second display area. The first plurality of preview images are associated with times prior to the first capture time. The plurality of instructions further include instructions that cause the data processor to display a second plurality of preview images in a third display area. The second plurality of preview images are associated with times subsequent to the first capture time. Moreover, the plurality of instructions include instructions that cause the data processor to save at least one of the first image, one of the first plurality of preview images, or one of the second plurality of preview images to a memory.

According to an alternative embodiment of the present invention, a graphical user interface for video editing is provided. The graphical user interface includes a first display area configured to display a first image. The first display area has a first side and a second side opposing the first side and wherein the first image is associated with a capture time. The graphical user interface also includes a second display area disposed on the first side and configured to display a set of sequential images associated with capture times previous to the capture time. The graphical user interface further includes a third display area disposed on the second side and configured to display a plurality of sequential images associated with capture times subsequent to the capture time.

According to another alternative embodiment of the present invention, a method of reviewing a snapshot image included in video footage is provided. The method includes displaying a main image in a first display area and displaying a first plurality of preview images in a second display area. The first plurality of preview images are extracted from a portion of the video footage prior to the main image. The method also includes displaying a second plurality of preview images in a third display area. The second plurality of preview images are extracted from a portion of the video footage subsequent to the main image. The method further includes displaying the snapshot image in a fourth display area, selecting the snapshot image using a user input device, displaying the snapshot image in the first display area in place of the main image, displaying a third plurality of preview images in the second display area, wherein the third plurality of preview images are extracted from a portion of the video footage prior to the snapshot image; and displaying a fourth plurality of preview images in the third display area. The fourth plurality of preview images are extracted from a portion of the video footage subsequent to the snapshot image.

Many benefits are achieved by way of the present invention over conventional techniques. For example, embodiments of the present invention present a large image of a single frame from video footage concurrently with multiple smaller preview images of frames from the video captured at times prior to and after the frame presented in the large image. Additionally, embodiments enable a user to quickly compare multiple snapshots taken from different time segments of video footage in a convenient display panel. Utilizing a convenient hovering capability, a user is able to temporarily display a video image from a smaller preview image in a larger display window. Moreover, embodiments provide a display system in which, when a user selects a snapshot image or preview image for display in the larger display window, preview images for video frames acquired prior to and after the selected image are automatically updated in corresponding preview panes. Furthermore, an embodiment provides multiple preview images, enabling a user to more quickly differentiate between frames that include desirable snapshot candidates.

By making use of image property detection methods, embodiments present pre-screened images to a user in the preview windows, thereby providing images that are likely to be good candidates for snapshots. Since embodiments display multiple preview images, the user can easily determine the presence of a better or more desirable image in proximity to the currently selected frame, thus allowing for the capture of improved snapshots as the user is readily able to view images from frames temporally close to the selected frame. Some embodiments enable the use of various technologies, such as sharpness/quality recognition, facial recognition, scene recognition, eyes-closed recognition, or the like to facilitate the snapshot selection process. Other implementations use an audio signal to determine relevant scenes that may be suitable for snapshot selection, for example, phrases such as "Smile," "Happy Birthday," or the like.

Embodiments of the present invention overcome a number of shortcomings found in conventional systems. For example, as described more fully throughout the present specification, conventional systems typically require a laborious process of reviewing individual frames of a video in order to extract a suitable snapshot. In contrast, the systems described herein reduce the amount of time and energy a user expends to find suitable snapshots. Another shortcoming of conventional systems is the inability to compare multiple frames and then determine which is the better or preferred snapshot candidate. The ability to compare multiple snapshots is provided by embodiments of the present invention. These and other embodiments of the invention along with many of its advantages and features are described in more detail in conjunction with the text below and attached figures.

DESCRIPTION OF SPECIFIC EMBODIMENTS

Figure 1:
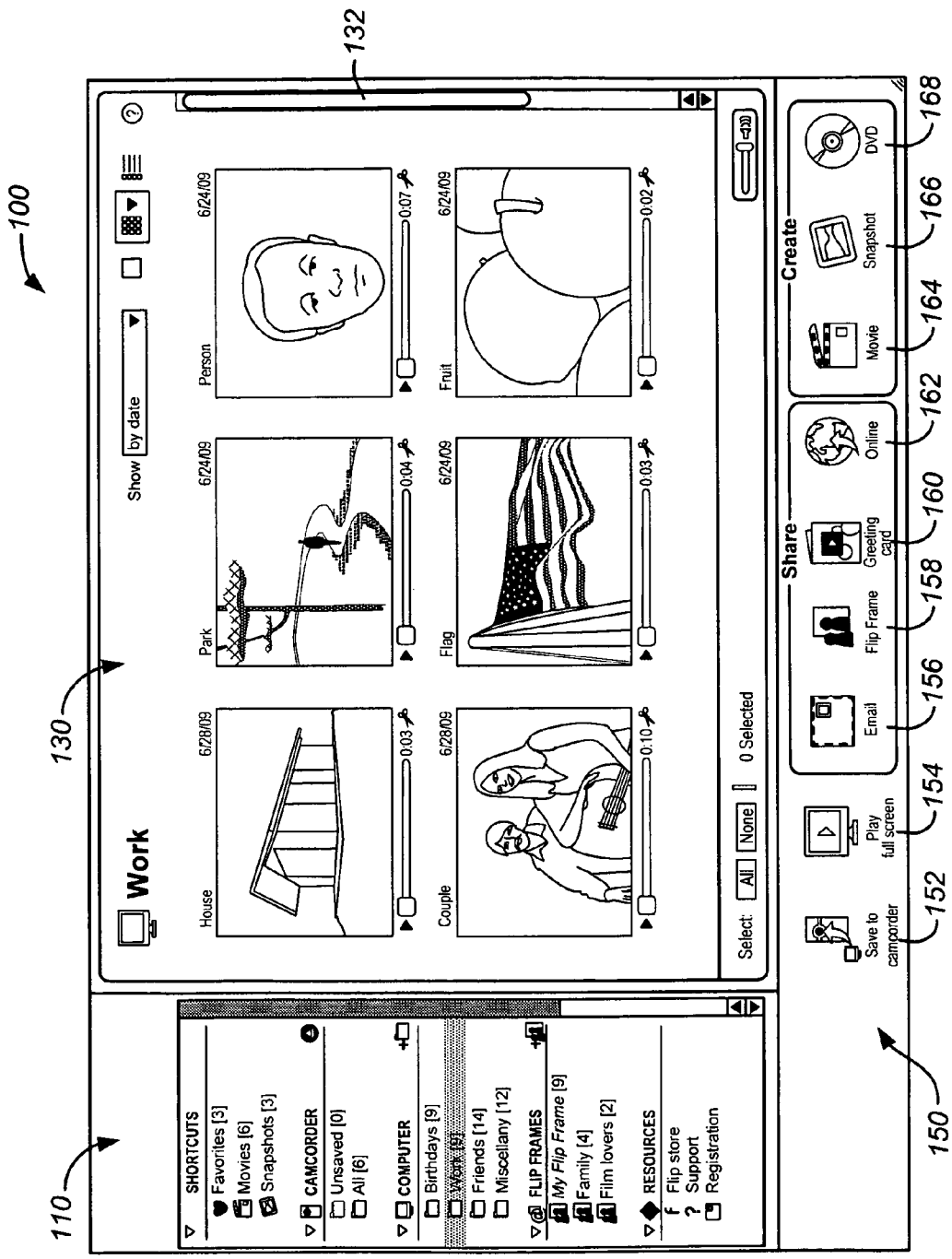
FIG. 1 is a simplified illustration of a graphical user interface for managing video footage according to an embodiment of the present invention.

FIG. 1 is a simplified illustration of a graphical user interface for managing video footage according to an embodiment of the present invention. The graphical user interface (GUI) 100 illustrated in FIG. 1 provides a user with graphical controls used to perform various tasks. As described more fully throughout the present specification, the GUI 100 is typically used in conjunction with a digital video camera having non-volatile memory present in the digital video camera. An example of a digital video camera with non-volatile memory is the Flip Video™ camera available from the present assignee (such as the Flip Ultra™ or the Flip Mino™). The Flip Video™ camera, which stores video footage on an internal flash memory, can be connected to a host computer (e.g., a personal computer) using a built-in data connector complying with the Universal Serial Bus (USB) standard. After connection to the computer, video footage stored in the non-volatile memory can be managed by the user through an illustrated GUI. Thus, in one embodiment, the GUI is part of the FlipShare™ software package available from the present assignee.

The GUI 100 includes a number of different display areas, for example, the navigation panel 110, the workspace 130 (in which both video and still images are displayed), and the action bar 150. The navigation panel 110 includes a display pane in which data stored on various devices (e.g., CAMCORDER and COMPUTER) can be shown to the user. In the embodiment illustrated in FIG. 1, the CAMCORDER has six videos stored in its internal memory, represented by the "[6]" text following the folder marked "All." The computer, which typically has a larger memory than that available on the digital video camera, has four folders (i.e., Birthdays, Work, Friends, and Miscellany). Of course, other numbers of folders are possible and the four illustrated in FIG. 1 are merely exemplary. Each of the folders includes a given number of videos, for example, nine videos in the Birthdays folder.

The GUI 100 also includes a workspace 130. Since the Work folder is selected in the navigation panel, a frame from some or all of the videos present in the Work folder are displayed in the workspace 130. In the particular example illustrated in FIG. 1, since there are nine videos in the Work folder, frames from six of the videos are shown, with the presence of additional frames illustrated by the slider on the scroll bar 132 being shorter than the length of the complete scroll bar. Although the video frames are illustrated as three across in FIG. 1, this is not required by embodiments of the present invention. Referring to the top right portion of the workspace, the video frames can be sorted by various criteria (by date in this example) and displayed one at a time, in groups of three across, or as a detailed list. Other display formats are included within the scope of the present invention and the illustrated formats are merely provided by way of example.

The action bar 150 includes a number of icons that enable a user to perform a variety of control tasks related to the video footage. It should be noted that in addition to the icons shown in the action bar 150, pull down menu controls are provided by embodiments of the present invention. Alternatively, the icons could be replaced by pull down menus. The control icons in the action bar include Save to Camcorder icon 152, which is used to provide the functionality of copying files from the host computer into the internal memory of the camcorder (including either internal memory or plug in memory cards). In some embodiments, the data stored is not limited to video data but can include any other suitable file type (e.g., pictures, music, or the like). Selection of a video or other data stored on the computer, followed by selection of the Save to Camcorder control will result in copying and storage of the selected video or data to the digital video camera. It should be noted that although the Save to Camcorder icon is illustrated in FIG. 1, selection of a video or data present on the CAMCORDER portion of the navigation panel, will result in changing of the Save to Camcorder icon into a Save to Computer icon as will be evident to one of skill in the art. The control icons also include a Play full screen icon 154 that is used to play a selected video in a full screen mode.

Several control icons that are grouped under a header labeled "Share" are used to share videos captured using the digital video camera with others. A video is selected and the Email icon 156 is used to email the selected video. The FlipFrame icon 158 is used in conjunction with FlipFrames™. FlipFrames™ are collections whose content is shared with other predetermined recipients over a network. When content is shared using a FlipFrame, the recipients receive notification about the new content via email or other means chosen by that recipient. A sender may drag content onto a FlipFrame's representation in the navigation panel 110, much like dragging files onto a directory, causing the content to automatically become available for viewing by the FlipFrame's recipients and sending those recipients notification about the presence of the new content. For example, if a FlipFrame folder is associated with a user's parents, then any video that is selected when the FlipFrame icon 158 is actuated will be viewable by the user's parents. Alternatively, using the Flip Frame icon 158 opens a dialog providing a toolset for handling FlipFrames including creating them, defining their recipients, and putting content into them.

Actuation of the Greeting card icon 160 will result in display of a dialog box enabling a user to make a personalized video greeting card, which can be emailed to a desired recipient. The Online icon 162 enables a user to share a selected video using one of several online sites, including myspace, YouTube, or the like.

Several control icons that are grouped under a header labeled "Create" are used to create video products based on video either captured using the digital video camera or from other suitable sources. Embodiments of the present invention provide a wide range of functionality in which any content accessible by the FlipShare™ software package can be managed. Merely by way of example, downloaded video content could be used. Actuation of the Movie icon 164 will result in display of one or more (e.g., a series) of dialog boxes in which one or more videos can be placed in a desired order for compilation in a movie. Titles and credits can be added along with music to create a unique movie based on one or more videos. Actuation of the DVD icon 168 will result in display of a dialog box used to store videos suitable for DVD creation and subsequent DVD creation. Other functionality can be provided by other embodiments as appropriate to the particular application. Additional description related to the functionality described herein is found in co-pending and commonly assigned U.S. patent application Ser. No. 11/497,039, filed on Jul. 31, 2006, the entire disclosure of which is hereby incorporated by reference in its entirety for all purposes.

Conventional video editing software has a number of specific shortcomings in the context of snapshot selection and capture. For example, it is difficult and time consuming to find the desired frame to extract as a snapshot. Since video footage may contain from 30-60 frames per second, a user will need to review many frames in order to select the frame with the desired properties for a snapshot. Moreover, since video frames may include motion or blurring, not all frames of a video are suitable for snapshots. Consequently, the user of conventional software wastes time reviewing these unsuitable frames.

Figure 2:
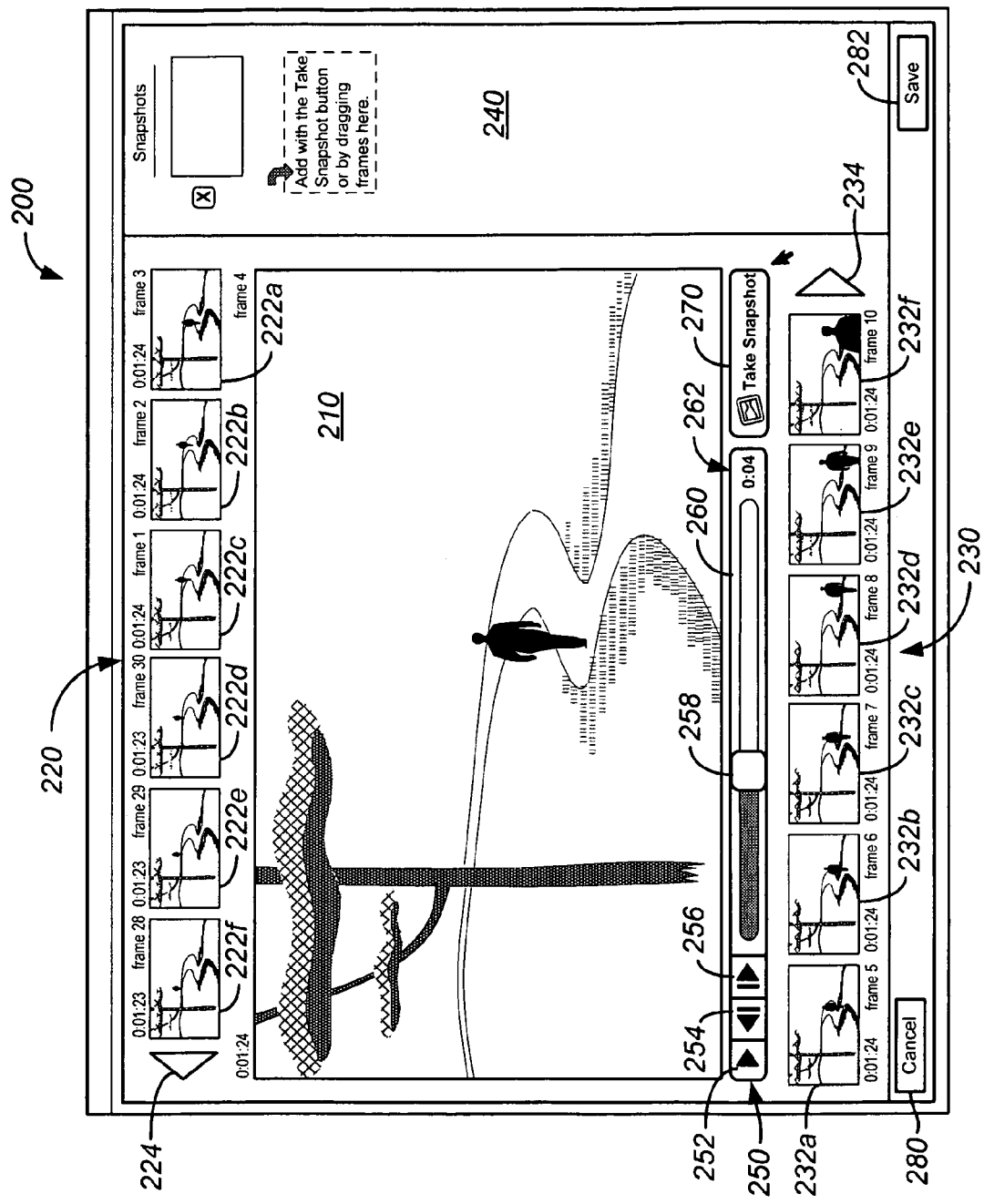
FIG. 2 is a simplified illustration of a graphical user interface for capturing snapshots from video footage according to an embodiment of the present invention.

Actuation of the Snapshot icon 166 after a video is selected will result in display of a dialog box or GUI used to select and save snapshots from a portion of video footage. FIG. 2 is a simplified illustration of a graphical user interface for capturing snapshots from video footage according to an embodiment of the present invention. Thus, the GUI 200 is displayed in response to actuation of the Snapshot icon 166 in one embodiment and in response to other user input (e.g., through a command in a pull down menu) in other embodiments. GUI 200 will either be displayed in place of or on top of a portion of GUI 100 as appropriate to the particular application. One of ordinary skill in the art would recognize many variations, modifications, and alternatives.

The GUI 200 illustrated in FIG. 2 includes a first display area 210 in which a first image is displayed. The first image is a still image from the video selected in GUI 110 when the Snapshot icon 166 is actuated. In particular, the first image is the frame from the selected video that was currently being displayed. If the video was selected, but had not yet started to play, the first image will be the first frame of the selected video. If the video playback had been started and the currently displayed image was not the first frame of the selected video (either playing or paused), the first image will be the frame that was being displayed at the time when the snapshot button was selected. In the illustrated example, the first image displayed in the first display area 210 is the image from the Park video shown in the top middle portion of workspace 130. The first image is also referred to as the main image and is typically larger than the other images that are displayed in GUI 200. Referring to FIG. 2, the first image is associated with a capture time and a frame index (i.e., 0:01:24, frame 4), which is the fourth frame of the 85$^{th}$ second (1 minute+25 seconds) of the video, which is four minutes long. Other identifiers other than frame index and a timestamp can be utilized, but frame index and timestamp are used for purposes of illustration in FIG. 2. The first display area is sized appropriately to the video footage, for example, either SD or HD.

As illustrated in FIG. 2, the first display area has four sides, with a second display area 220 positioned on a first side of the first display area, i.e., above the first display area. The second display area includes six preview images 222a-222f, which are images extracted from the video prior to the capture time. Thus, the second display area 220 can be referred to as a preview area. This preview area displays preview images preceding the main image, providing the user with a number of images captured prior to the main image. In the illustrated embodiment, the six preview images 222a-222f are six sequential images from the six frames preceding the frame displayed in the first display area: frames 3, 2, and 1 of 0:01:24 and frames 30, 29, and 28 of 0:01:23.

A third display area 230 is positioned on a second side of the first display area, i.e., below the first display area. The first and second sides of the first display area are opposing sides. The third display area includes six preview images 232a-232f, which are images extracted from the video subsequent to the capture time. Thus, the third display area 230 can be referred to as another preview area. In the illustrated embodiment, the six preview images 232a-232f are six sequential images from the six frames following the frame displayed in the first display area: frames 5, 6, 7, 8, 9, and 10 of 0:01:24. In contrast with conventional snapshot selection software, embodiments of the present invention provide a user with multiple snapshots or stills surrounding the selected image, enabling the user to easily compare images captured in the temporal vicinity of the selected image. As shown in FIG. 2, images preceding and following the main or selected image provide the user with a set of images that may provide a better snapshot than the originally selected snapshot. Although six preview images are illustrated in FIG. 2, this particular number is not required by the present invention and other suitable numbers of preview images can be displayed in other embodiments. The preview images are illustrated as smaller than the image in the first display area and all the same size. This is not required by the present invention and the size of the various images is variable depending on the particular application. One of ordinary skill in the art would recognize many variations, modifications, and alternatives.

As described more fully below, GUI 200 includes a scrollbar 250 having a play/pause button 252. The scrollbar 250 may also be referred to as a scrubber or a user input device. The play/pause button 252 toggles between play and pause depending on whether the video is playing in the first display area or paused. When the video is playing, the preview images in the second and third display areas are initially grayed out. When the video is paused, the preview images will be populated as described more fully throughout the present specification. In some embodiments, after the video has been paused and the preview images are populated, when the play/pause button 252 is selected and the video begins to play again, the preview images remain unchanged during video playback. In other embodiments, the preview images are once again grayed out during video playback and while moving the scroll box. When the video is subsequently paused, the preview images will be populated again based on the position at which the video is paused.

The GUI 200 also includes a fourth display area 240 that is configured to display one or more snapshot images (not shown). As shown in FIG. 2, the fourth display area 240 is positioned horizontally to a third side of the first display area 210. Other placements of the fourth display area are provided in alternative embodiments. As described more fully throughout the present specification, the snapshot images displayed in the fourth display area, also referred to as a snapshot panel, may be displayed as a stack of images arrayed in a temporal order. In a specific embodiment, the snapshots are displayed in the order that they are taken, which does not necessarily coincide with their relative temporal position in the video. Thus, embodiments of the present invention include display and ordering of snapshots in several different manners. One of ordinary skill in the art would recognize many variations, modifications, and alternatives.

The snapshot panel 240 (i.e., the fourth display area) provides functionality not available using conventional video editing software. In conventional software, snapshots, also referred to as stills, are taken and saved, but no mechanism is provided for comparing one snapshot to another. Typically, when a user pauses an image, the paused image can have motion artifacts, a person in the image may have closed eyes, or the like. Stepping through frames does not provide for sufficient comparison in some applications, particularly when changes between frames are small. Thus, determining which frame is the best frame to extract is difficult using conventional software.

Embodiments of the present invention provide methods and systems that enable a user to compare multiple snapshots at a single time and then select one or more of the multiple snapshots for saving after the comparison.

The scrollbar 250 also includes a single frame retreat button 254 to move back by a single frame in the video, a frame advance button 256 to advance by a single frame, a scroll box 258 positioned in trough 260, and a time indicator 262. In other embodiments, multiple frame retreat and advance buttons are utilized in place of the single frame retreat and advance buttons to provide the functionality of retreating or advancing by a predetermined number of frames. In some embodiments, the time indicator may utilize a frame index and is associated with the position of the scroll box along the trough. Thus, the time indicator 262 is not strictly limited to time stamps, but may utilize other mechanisms to indicate a temporal relationship between frames. By clicking and dragging the scroll box 258, also referred to as a tab or a thumb, a user is able to move forward and backward in time along the length of the video footage. Thus, using the scrollbar 250, the user is able to move to any time point within the sequence of frames making up the video footage.

Adjacent to the scrollbar 250 a Take Snapshot selection box 270 is provided. As described more fully throughout the present specification, the Take Snapshot selection box 270 is used to capture a snapshot of the image displayed in the first display area.

If a user clicks on or otherwise selects one of the preview images, the selected preview image will be displayed in the first display area 210. Additionally, in response to the selection of the preview image, the preview images displayed in the second and third display areas will repopulate to display preview images prior to and subsequent to the selected preview image. Thus, for example, if the user selects preview image 232e (0:01:23, frame 9), then preview image 232e will be blown up and displayed in the first display area 210. The six sequential preview images 222a-222f will be repopulated using frames 3, 4, 5, 6, 7, and 8 of 0:01:24, respectively, which are the six frames prior to the selected preview image. The six sequential preview images 232a-232f will also be repopulated using frames 9, 10, 11, 12, 13, and 14 of 0:01:24, respectively, which are the six frames subsequent to the selected preview image. The scroll box 258 will be repositioned to a location associated with the capture time of the selected preview image. In this example, the scroll box 258 would be repositioned slightly to the right of the position illustrated in FIG. 2. In one implementation, if the user double-clicks on one of the preview image, the preview image will be added to the stack of images in the snapshot panel 240.

In some embodiments, other user input devices other than the scrollbar 250 are utilized to control video playback. For example, a user may utilize a mouse, trackball, jogwheel, or other suitable input device to play/pause the video, step through the video in a frame by frame manner, scroll through the video at a faster rate, or the like. In a particular implementation, the speed at which a scroll wheel on a mouse is spun is used to determine the speed at which the user scrolls through the video footage. Use of a mouse with a scroll wheel is thus just one of the methods in which a user can simulate moving the scroll box 258. Thus, embodiments provide multiple methods of controlling video playback not limited to use of the scrollbar 250.

In another embodiment, rather than populating the preview areas 220 and 230 with the six previous and six subsequent frames, respectively, the preview areas can be populated with frames spaced at either larger linear or non-linear intervals. For example, with reference to the frame displayed in the first display area (i.e., the main image), the preview area for previous frames may display images that were captured a predetermined number of frames prior to the main image, for example, −1, −2, −4, −8, −16, −32, etc. frames prior to the main image. Other sequences are also included within the scope of the present invention, for example, 8, 27, 64, 125, 216, and 343, which is a sequence based on $n^3$. Thus, in these embodiments, the preview frames prior to the main frame are spread out farther in time as a function of time, enabling a user to view a larger time horizon in the same display area. Similar spreading of the subsequent preview frames in time is provided as well.

In yet another embodiment, combinations of linear or non-linear time intervals between preview images and the use of logic or algorithms to find candidates suitable for snapshots are utilized. In these embodiments, rather than merely displaying preview images based on linear or non-linear frame intervals, frames surrounding the frame determined by the interval are examined using logic to determine and then display suitable frames. For example, in the first example discussed, above, a number of frames surrounding the frame that is 16 prior to the main image would be examined and the best frame (e.g., frame −20) selected for display in the preview area associated with frame −16.

Figure 3:
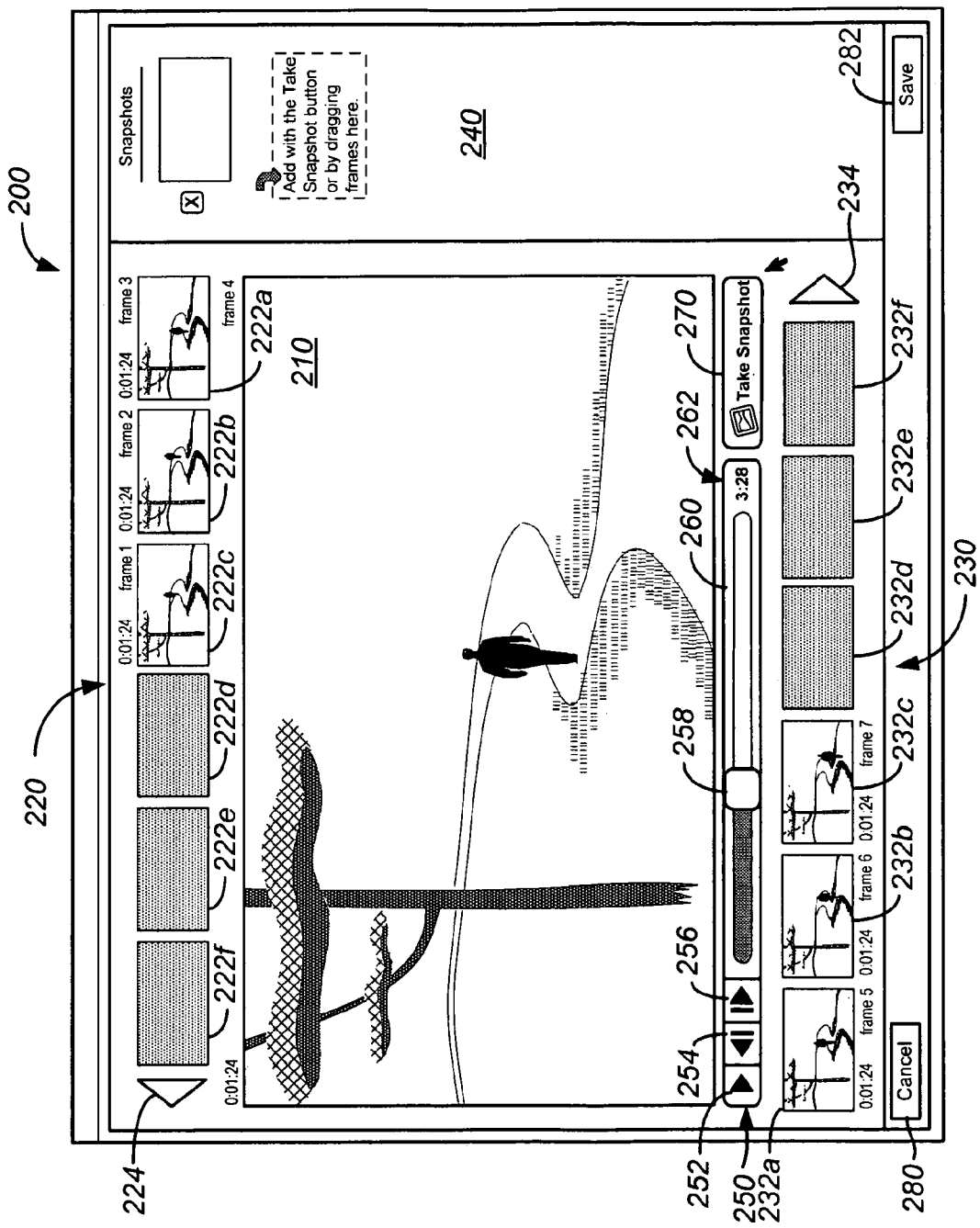
FIG. 3 is a simplified illustration of the graphical user interface shown in FIG. 2 in an animation mode of operation according to an embodiment of the present invention.

FIG. 3 is a simplified illustration of the graphical user interface shown in FIG. 2 in an animation mode of operation according to an embodiment of the present invention. According to embodiments of the present invention, when a user selects a snapshot image in GUI 100, the first display area 210 will display the selected snapshot image and the preview images in the second display area 220 and the third display area 230 will be populated in an animated, chronological order. As an example, FIG. 3 illustrates a snapshot image from frame 4 of 0:01:24 displayed in the first display area 210. The preview images for frames prior to the snapshot image will be populated in the second display area 220 in reverse chronological order, that is, preview images 222a, 222b, 222c, 222d, 222e, and then 222f will be displayed, presenting the user with an animated visual effect rolling from the right to the left across the second display area 220. As illustrated in FIG. 3, the animation has proceeded to the point at which only the first three of the preview images (222a, 222b, and 222c) captured prior to the main image are displayed. The remaining preview images are grayed out until the animation proceeds to populate these preview images (222d, 222e, and 222f).

The preview images for frames subsequent to the snapshot image will be populated in the third display area 230 in chronological order, that is, preview images 232a, 232b, 232c, 232d, 232e, and then 232f will be displayed, presenting the user with an animated visual effect rolling from the left to the right across the third display area 230. The animations for the second and third display areas can be performed concurrently, with both the preview and subsequent previews populating at the same time, for example, 222f and 232a, 222e and 232b, etc., resulting in animations flowing to the left above the first display area and to the right below the first display area concurrently. As illustrated, the boxes in which the preview images are typically displayed are grayed out prior to display of the preview as a result of the animations. One of ordinary skill in the art would recognize many variations, modifications, and alternatives.

Figure 4:
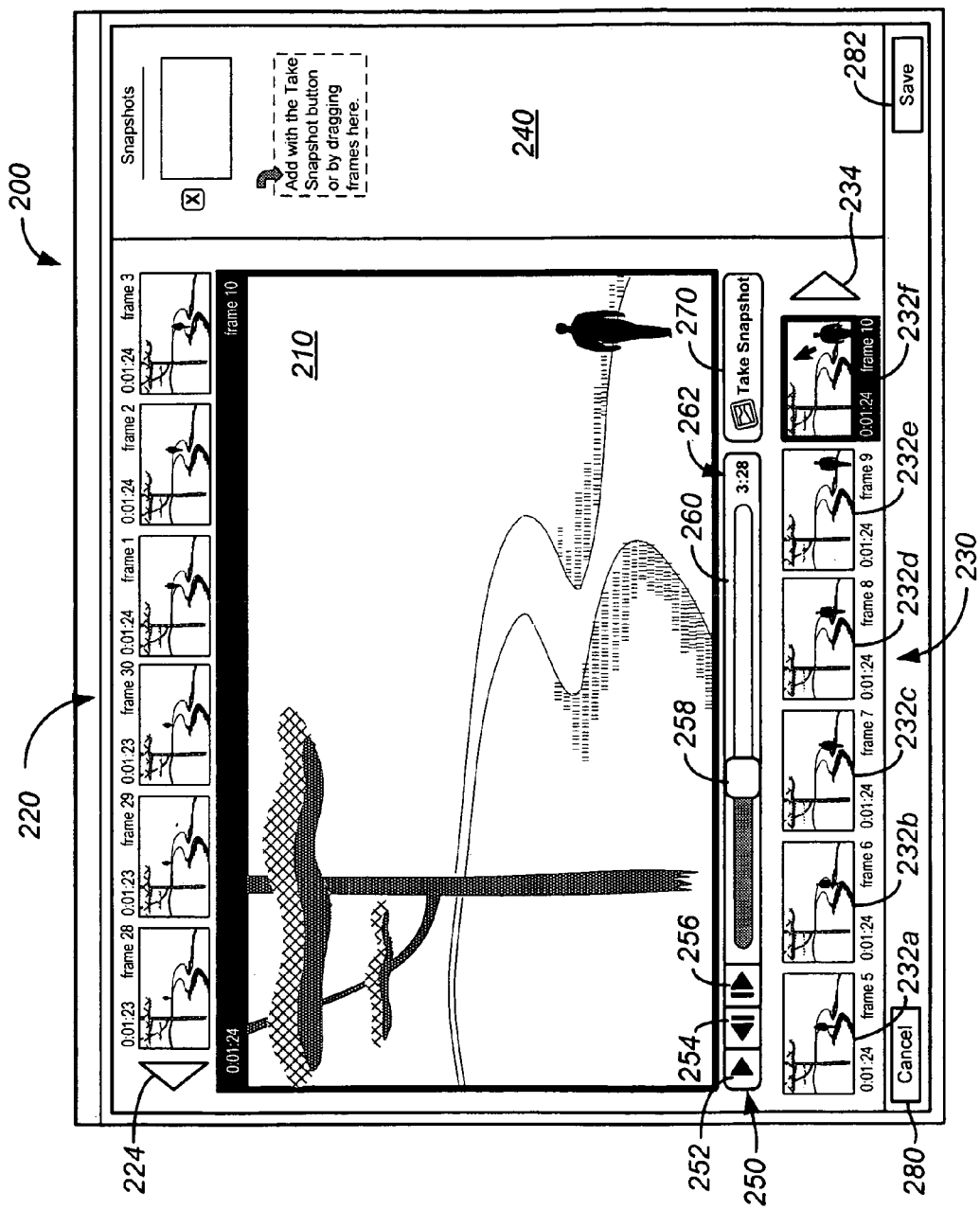
FIG. 4 is a simplified illustration of the graphical user interface shown in FIG. 2 in a hover mode of operation according to an embodiment of the present invention.

FIG. 4 is a simplified illustration of the graphical user interface shown in FIG. 2 in a hover mode of operation according to an embodiment of the present invention. As shown in FIG. 4, the user has hovered a cursor or mouse over preview image 232f. In response to this hover action on the part of the user, a black border is displayed around the outer edge of the preview image. Additionally, the image from the preview image 232f is displayed in the first display area along with a black border around the outer edge of the image, indicating that the user is hovering over the preview image. Although the black border similar to a video editing border is utilized in the embodiment illustrated, in FIG. 4, this is not required by the present invention and other borders or no border may be utilized as appropriate to the particular application.

It should be noted that hovering over the preview image 232f only temporarily displays the preview image as a larger image in the first display area. When the hovering is stopped, for example, by moving the cursor or mouse off of the preview image, the original image is redisplayed in the first display area. Thus, the hovering functionality provided by embodiments of the present invention enables a user to easily and quickly blow up the preview images for comparison with other preview images while not modifying the display in a permanent manner.

As discussed in relation to FIG. 2 above, if, after hovering over a preview image, a user clicks or otherwise selects the preview image, the preview images displayed in the second and third display areas will repopulate to display preview images prior to and subsequent to the selected preview image. Referring to FIG. 4, when the user hovers over preview image 232f, this preview image is displayed in the first display area as illustrated. When the user clicks on preview image 232f, the preview images in the second and third display areas will repopulate based on preview image 232f, e.g., six frames previous to and six frames subsequent to the image at 0:01:24, frame 10.

Since, after the selection operation, the cursor is still placed over preview image 232f, the normal hover operation would temporarily replace the image in the first display area with the image recently repopulated into preview 232f. This semi-recursive replacement of the main display image could be less than desirable. In order to maintain the selected image (e.g., the image at 0:01:24, frame 10) in the first display area after the user selection operation (and continued hovering), embodiments of the present invention temporarily suspend the hover operation immediately after a selection operation.

In these embodiments, after a selection operation, the hover functionality is temporarily suspended until the user moves the cursor by a predetermined amount, for example, off of the selected preview image. When the user moves the cursor to another preview image or a snapshot image, the hover functionality is restored. Additionally, if the user moves the cursor off of the preview image 232f and then back onto preview image 232f again, the hover functionality is also restored as the user effectively "resets" the hovering process.

Figure 5:
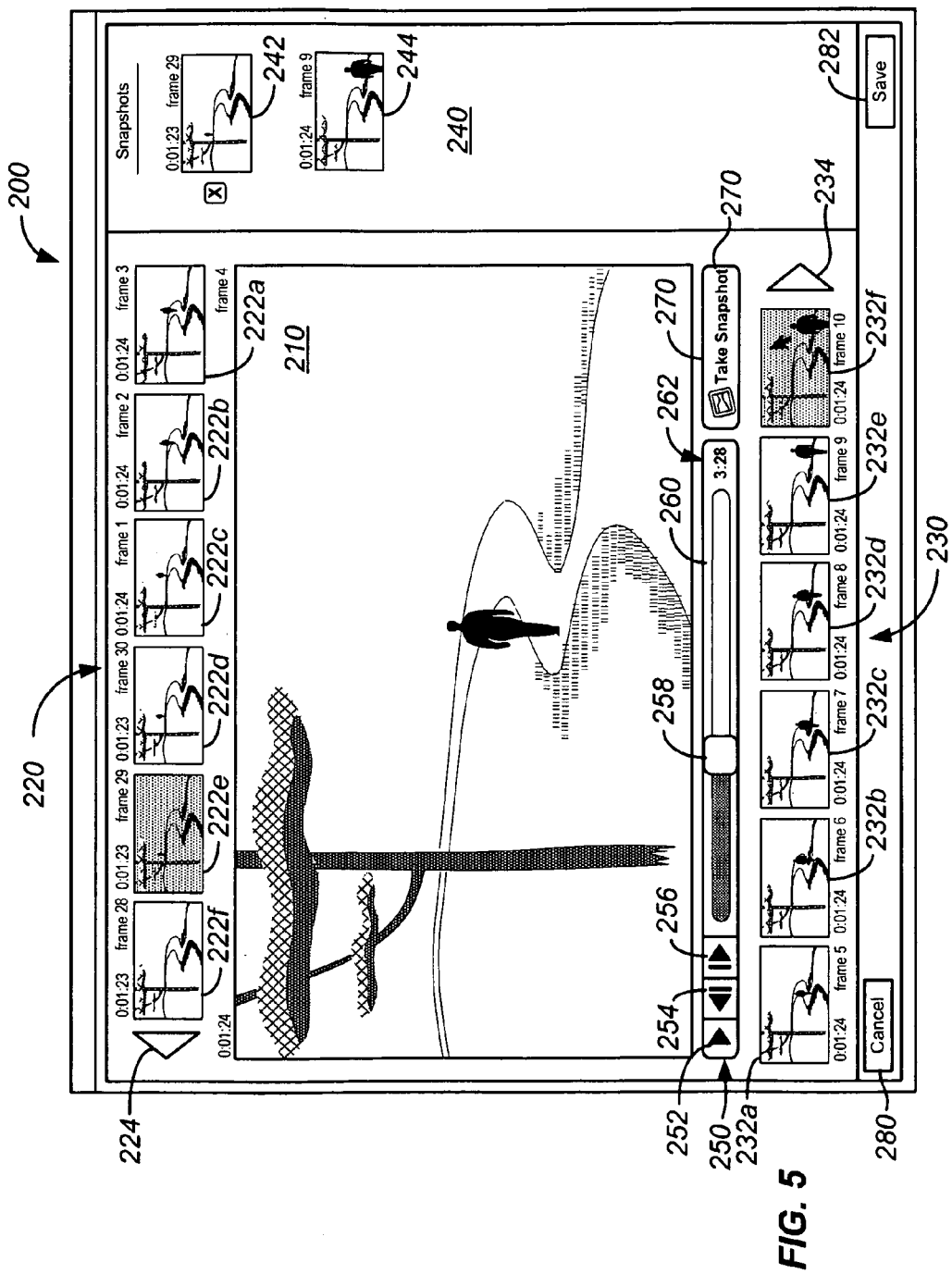
FIG. 5 is a simplified illustration of the graphical user interface shown in FIG. 2 in a snapshot selection mode of operation according to an embodiment of the present invention.

FIG. 5 is a simplified illustration of the graphical user interface shown in FIG. 2 in a snapshot selection mode of operation according to an embodiment of the present invention. The fourth display area or snapshot panel 240 includes two snapshots 242 and 244 selected by the user. In order to select the illustrated snapshots and place them in the snapshot panel, the user typically positions the desired image in the first display area and then selects the Take Snapshot selection box 270 illustrated in FIG. 2. The image displayed in the first display area will be captured and a preview version of the selected snapshot will appear in the snapshot panel as shown in FIG. 5. The user positions the desired image in the first display area by moving through the video footage in response to selection (i.e., double clicking) of preview images or clicking on arrows 224 and 234. Additionally, a user could play a video and then stop at the appropriate time. Alternatively, a user could drag or otherwise move the slider to select the desired image. In another embodiment, the user selects the snapshot by dragging either the image in the first display area or one of the preview images into the snapshot panel. Other techniques suitable for selecting snapshots are included within the scope of the present invention, for example, using a pull-down menu. One of ordinary skill in the art would recognize many variations, modifications, and alternatives. In FIG. 5, two snapshots are illustrated in the snapshot panel.

The snapshots displayed in the snapshot panel are arrayed as a stack of images and are "stacked" in the display area in reverse chronological order as extracted from the video footage, with the most recently created images appearing at the top of the snapshot panel. The stack of snapshot images enables a user to easily compare various snapshots extracted from the video footage. As an example, a user reviewing a particular scene of the video takes several snapshots that are spaced over several seconds of time. Since the display areas in GUI 200 only display 13 frames at a time, less than a second of video footage is displayed concurrently for video at 30 frames per second. However, by taking several snapshots that are spaced at a time interval, for example, of more than a second, the stack of snapshots displayed in the snapshot panel allows the user to compare the various snapshots and select the best image from the multiple images.

When a user hovers over one of the snapshots (e.g., snapshot 242 or 244) displayed in the snapshot panel 240, the image associated with that snapshot is blown up and displayed in the first display area, without disturbing any of the preview images 222a-222f or 232a-232f. Subsequently moving the cursor or mouse off of that snapshot will result in the image that was originally displayed in the first display area (prior to the hover operation) being redisplayed in the first display area. Thus, using the hover capability, a user is able to easily magnify the snapshot images for quick comparison, without making any permanent changes to the displayed images.

When a user clicks (or double clicks in some implementations) on a snapshot displayed in the snapshot panel, the image in the main display area 210 will be changed to display the image from the selected snapshot and the preview images in the second and third display areas will be repopulated based on the temporal characteristics of the selected snapshot, which is now displayed in the main display area. The control bar 250 and the time indicator also refresh as appropriate to the display of the selected snapshot in the first display area. In effect, when a user selects a preview image from the snapshot area, the video will "snap" to that frame within the video. Thus, this method of selecting a snapshot enables the user to view the selected snapshot in the main display area as well as the 12 images captured prior to/subsequent to the selected snapshot, allowing the user to make additional comparisons with the snapshot image.

As illustrated in FIG. 5, the two snapshots are "stacked" in the snapshot panel in chronological order with the earliest images positioned at the bottom of the snapshot panel. In other embodiments, the snapshots are stacked in the order in which they are taken by the user. In another embodiment, metadata is stored when snapshots are taken, enabling a persistent snapshot characteristic. When a video for which snapshots have already been taken is subsequently opened, the stored metadata related to the snapshots previously taken is used to automatically populate the snapshot panel with the previously taken snapshots. Thus, in this implementation, the user doesn't need to scan the video footage for the locations of the previous snapshots, but is able to quickly move to the portion of the video footage near the various snapshots, which is typically representative of the portions of the video footage that the user found interesting. As an example, if a user selects five snapshots from a given video, the next time that video is opened, the five snapshots will be stacked in the snapshot panel when the user activates GUI 200. Thus, by selecting one of the snapshots, the user can navigate directly to that frame within the video.

In another embodiment, preview images from the video footage are automatically generated and displayed for the user's convenience. Methods of identifying and then displaying "interesting" snapshot images from a video described throughout the present specification can be utilized in automatically generating these preview images. For example, when a video is opened, a number (e.g., 10-20 or other suitable number) of snapshot images associated with key portions of the video footage are automatically selected and displayed, providing the user with an overview of the video footage. Using these summary thumbnails or preview images, a user is able to quickly navigate to portions of the video of particular interest. Without playing the entire video, the user is provided with an overview of the multiple scenes and topics included in the video footage. Various techniques can be used to select the snapshot images, for example, scene changes such as the transition from an inside shot to an outside shot, audio such as "Happy Birthday," or the like. The automatically populated preview images can be displayed in the second and third display areas or in some other suitable manner. When a user selects one of the preview images, similar to other user selections described herein, the GUI 200 will snap to the selected video, displaying the selected preview image in the first display area and updating the second and third display areas in accordance with the selected preview image. By populating the preview images based on interesting features of the video footage, easy navigation throughout the video is provided.

Referring to FIG. 2, a cancel button 280 is provided at the bottom left corner of GUI 200 and a save button 282 is provided at the bottom right corner of GUI 200. If the snapshot panel is empty, then clicking on the save button 282 will result in the image displayed in the first display area being saved as a snapshot. If one or more snapshots are displayed in the snapshot panel, then clicking on the save button will result in the displayed snapshots being saved as snapshots. In some embodiments, a pop-up menu is used to assign file names to the snapshots, whereas in others, a default file name is assigned based on the video title, timestamp, frame index, and/or other properties of the image.

In some embodiments, the preview images that are displayed in the second and third display areas are selected, not just based on temporal order, but on an intelligent frame detection and capture algorithm. For example, an embodiment may use logic to scan multiple frames preceding and following a predetermined frame for good snapshot candidates, representative (different) samples from throughout the video, face detection, or the like. Thus, improvements in the snapshot selection process are provided in which snapshots are displayed, not just based on a temporal relationship to other frames, but based on logic to provide previews more suitable for high quality snapshots, thereby saving time for the user.

Embodiments of the present invention provide a number of methods of identifying and then displaying "interesting" snapshot images from a video. For example, in selecting the snapshots to be displayed in the fourth display area illustrated in FIG. 2, an automated program could pull individual frames from the video by scanning through the video and determining frames that are suitable for use as still pictures. When GUI 200 is activated, either the preview images or the snapshot panel could be populated with preview images and/or snapshots selected for their use as still pictures, not based on their capture times.

In surveying a list of videos, the simplest methods for showing a single image identifying what video footage contains are unsatisfying. In some conventional software, the first frame of the video footage is used. In other conventional software, a frame from the middle of the video footage is used. Identifying a well-chosen, interesting image or several interesting images, either shown as part of the listing for the video footage or revealed on a rollover, will provide the user with more and better information than available using conventional techniques. In viewing a video, interesting frames could be identified as a way of enabling a viewer to jump quickly through the video.

Metrics associated with utility for still images include, but are not limited to:

Is the image in the frame sharp?
Does the image have brightness, contrast, and color that are likely to read well?
Does the image contain one or more faces?
Are people's eyes open in the image?
Is the image very different from other frames in the video?
Is the image very different from other interesting frames in the video?
Is the image spaced in time by a certain amount from other interesting frames? (A set of quasi-evenly spaced frames is more representative of the video than a set of frames from only one part of the video.)

In some embodiments, one or more of the above listed metrics are utilized to provide a single new metric that is a combination of several metrics. Depending on the particular application, a weight could be given to the component metrics and the algorithm could be tuned to optimize the weights. It is known that as a result of video sampling and/or compression algorithms, some images tend to be sharper or more crisp than others. Thus, the weight given to image sharpness can be varied to increase or decrease the importance given to image sharpness in picking interesting frames.

In another embodiment, information regarding the encoding scheme used to encode the video can be used and key frames identified for which the image properties are suitable for use as still images. Thus, using either metrics associated with the frames, data properties associated with the video file, or combinations thereof, can be used to select either the main image, the preview images, or the snapshots. Since, when a user pauses the video to examine the snapshots, it is difficult to stop the video with a precision of 1/30 of a second (for video shot at 30 frames per second), it is common that the frame displayed in the first display area upon stopping is not the intended frame. Thus, embodiments of the present invention can search the frames surrounding the putatively selected frame, and then display the most interesting of the frames surrounding the putative frame.

Additionally, other embodiments could automatically populate the snapshot panel (i.e., the fourth display area) with snapshots automatically selected from the video based on the algorithms and metrics discussed above. Thus, when a user actuates GUI 200, rather than starting with an empty snapshot panel, the snapshot panel would automatically be populated with interesting snapshots. An additional button could be provided on GUI 100 in addition to the Take Snapshot button 270, for example a Smart Snapshots button that would result in automatic population of the snapshot panel. Depending on the implementation, a predetermined time interval could be used in populating the snapshot panel, for example, interesting images captured within ten minutes prior to or subsequent to the main image By automatically placing snapshot images in the stack, the hover feature can be used to blow up any of the snapshots, enabling the user to make quick comparisons between images. As discussed throughout the present specification, selecting a snapshot image will result in the snapshot being displayed in the first display area and updating of the preview images accordingly. Thus, automatic snapshot selection can be combined with the other techniques and methods described herein.

Figure 6:
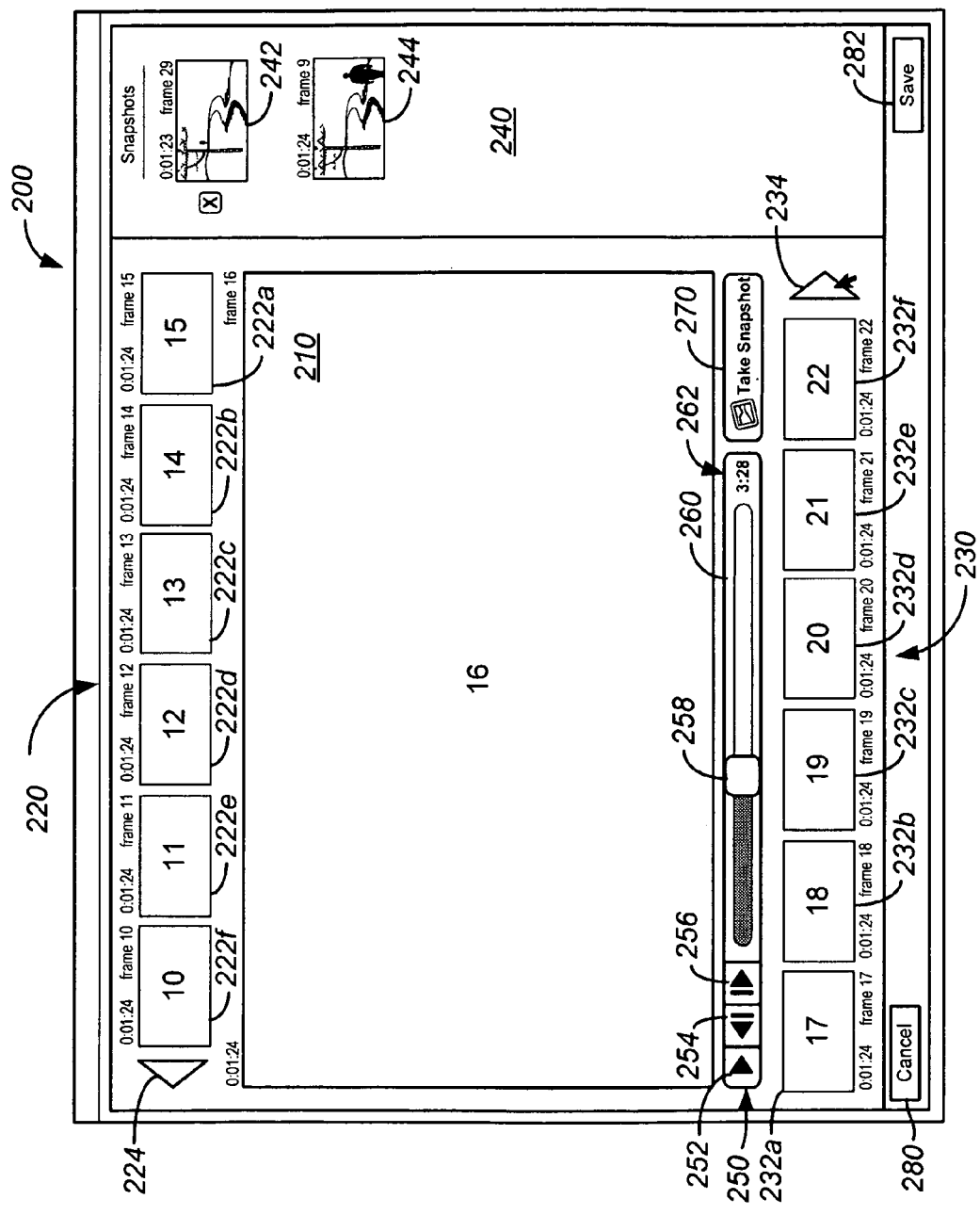
FIG. 6 is a simplified illustration of the graphical user interface shown in FIG. 2 in a multiple frame advance mode of operation according to an embodiment of the present invention.

FIG. 6 is a simplified illustration of the graphical user interface shown in FIG. 2 in a multiple frame advance mode of operation according to an embodiment of the present invention. The second display area 220 and the third display area 230 also include two large arrows 224 and 234. Using arrows 224 and 234, a user is provided with another method to navigate through the video footage in addition to selecting a preview image, which results in repopulation of the preview images based on the selected preview image. By clicking on arrow 224 displayed in the second display area, the video footage will "rewind" by a predetermined number of frames. In the illustrated embodiment, the video footage will rewind by 12 frames. By clicking on arrow 234 displayed in the third display area, the video footage will "fast-forward" by a predetermined number of frames (e.g., 12 frames).

Thus, starting at the condition illustrated in FIG. 2, in which the preview image 232f is associated with frame 10 of 0:01:24, clicking on arrow 234 (forward arrow) will result in frame 10 of 0:01:24 shifting 12 frame periods back in time so that it will be displayed as preview image 222f as shown in FIG. 6. Because the frame associated with the latest time frame in FIG. 2 is now the frame associated with the earliest time frame in FIG. 6, all the preview images and the main image are shifted 12 frames forward in time. Thus, in FIG. 6, the user is able to view the last frame displayed in FIG. 2 and the subsequent 12 frames from the video footage. Advancing forward by 12 frames with a single click on arrow 234 and stepping back in time by 12 frames by clicking on arrow 224 enables the user to quickly scan through video footage surrounding the initially selected snapshot. The first display area will display an image associated with 12 frames either forward or backward in time in relation to the original frame displayed in the first display area. For video footage shot at 30 frames per second, several clicks on one of the arrows 224 or 234 will enable the user to view still images seconds ahead or seconds behind the originally selected image, providing an opportunity to quickly scan still images for capture as a snapshot. Although scanning by 12 frames is discussed above, this particular number of frames is not required by embodiments of the present invention and other predetermined numbers can be utilized in alternative embodiments, for example, 30 frames, 60 frames, or the like.

As discussed in relation to FIG. 3, the repopulation of the preview images will be in an animated fashion, rolling backward and forward in time for the previous and subsequent frames, respectively in various embodiments of the present invention. When a user clicks on either arrows 224 or 234, the frames displayed will rewind or advance by the predetermined number of frames (e.g., 12) and the new preview images will be displayed with a representation of movement either backward or forward in time. The animation will provide the user with a pleasing graphical experience.

Figure 7:
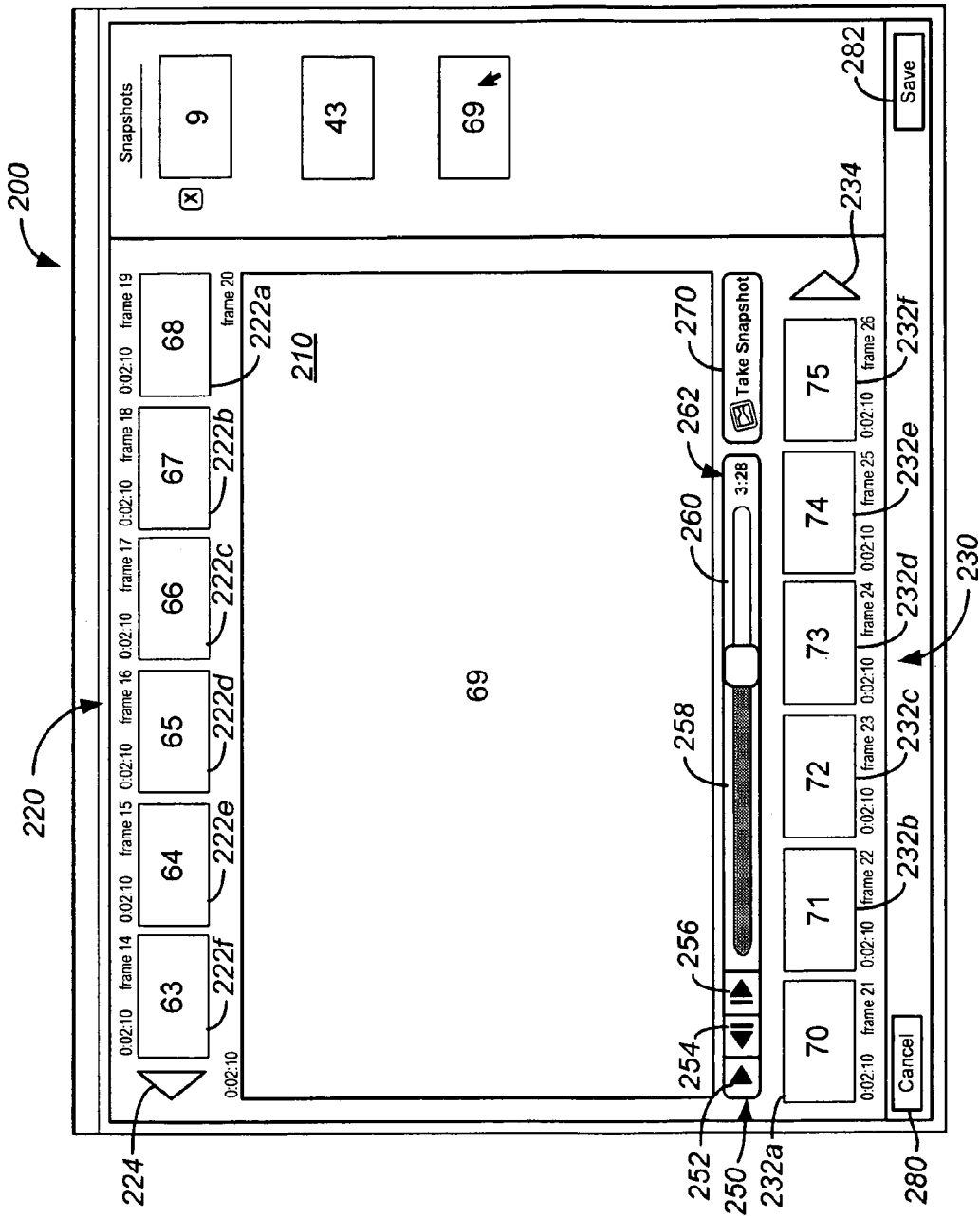
FIG. 7 is a simplified illustration of the graphical user interface shown in FIG. 2 in a snapshot exchange mode of operation according to an embodiment of the present invention.

FIG. 7 is a simplified illustration of the graphical user interface shown in FIG. 2 in a snapshot exchange mode of operation according to an embodiment of the present invention. When a user selects one of the snapshots displayed in the snapshot panel, for example, by clicking on the snapshot, double clicking on the snapshot, or other suitable selection mechanism, the snapshot image will be displayed in the first display area 210 and the preview images will be updated accordingly. Animation of the preview images as described throughout the present specification may be used in updating the preview images.

Referring to FIG. 7, the user has selected snapshot 69, which corresponds to frame 20 of 0:02:10. The six preview frames prior to snapshot 69 are thus frames 14-19 of 0:02:10 and the six preview frames after snapshot 69 are frames 21-26 of 0:02:10. The action bar 250 also updates in accordance with snapshot 69 being displayed in the first display area. Thus, as illustrated in FIG. 7, the scroll bar 258 has shifted to the right since the selected snapshot is later in the video footage than the capture time of the previously displayed image. Of course, the particular frame times illustrated are just used as examples. The updating of the preview images temporally surrounding the selected snapshot provide the user with the ability to easily compare multiple snapshots at the same time. As discussed previously, hovering over any of the newly updated preview images will display that preview image in the first display area and selecting any of the preview images will exchange the selected preview image with snapshot 69.

Figure 8:
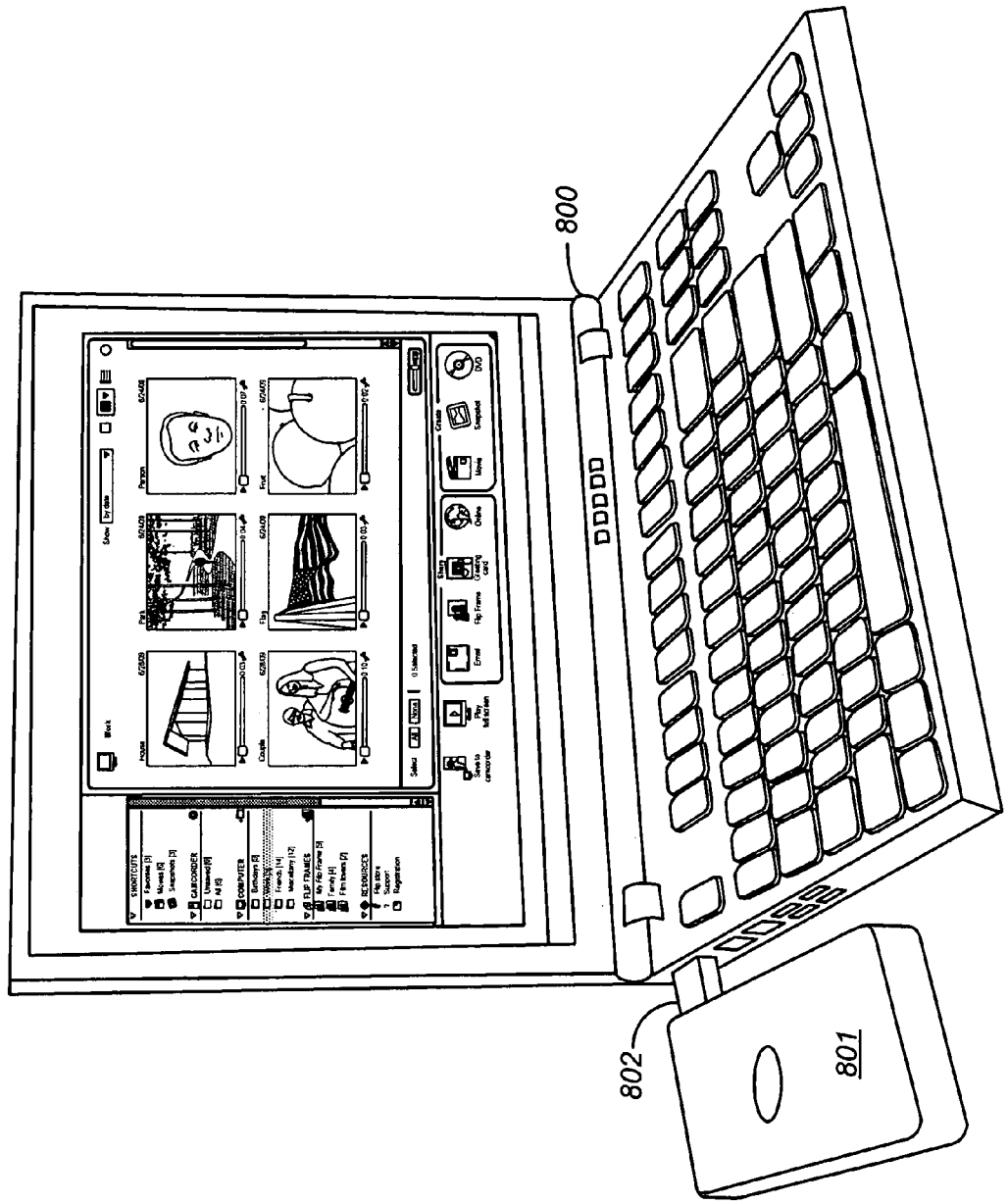
FIG. 8 illustrates a digital video camera connected to a computer system according to an embodiment of the present invention.

FIG. 8 illustrates a digital video camera connected to a computer system according to an embodiment of the present invention After using the digital video camera 801 to capture digital video footage, a user can extend the data connector arm 802 and attach the digital video camera 801 directly to an external device 800. As illustrated in FIG. 8, digital video camera 801 is connected through data connector arm 802 to external device 800. In one embodiment, external device 800 is a computer system such as a personal computer (PC). External device 800 can also be a download and processing station such as an in-store kiosk where video footage can be viewed, edited, or recorded onto a digital video disc (DVD) or other suitable media.

In one embodiment, the external device 800 can detect when a connection is made between the digital video camera 801 and the external device 800. For instance, the data connector arm 802 may conform to a data transfer protocol such as the Universal Serial Bus (USB) protocol that specifies mechanisms for detecting when such a connection has been established. In other embodiments, the data connector is configured to communicate with a firewire port, a serial port, or another type of port that is capable of receiving the data connector arm 802.

After the digital video camera 801 is connected to the external device 800, the digital video camera 801 may identify itself to the external device 800 as a mass storage device, such as a removable disk drive or a compact disc (CD) drive. In one embodiment, for instance, a digital video camera 801 plugged into a PC may identify itself as a removable disk drive to an operating system running on the PC. The operating system can then treat the internal memory of the digital video camera 801 like any other removable disk. The internal memory of the digital video camera 801 may also be formatted using a file system format compatible with the operating system. For example, the non-volatile memory for data storage of a digital video camera 801 to be used with a PC may be formatted according to the New Technology File System (NTFS) or File Allocation Table (FAT) file system formats so that data contained on the non-volatile memory is accessible to an operating system such as a Windows® operating system. The user can then access the contents in the non-volatile memory of digital video camera 801 in the same manner as any other removable disk, using the standard operating system interface.

In one embodiment, a resident software application is stored in the non-volatile memory provided for data storage in the digital video camera 801. When a connection between the digital video camera 801 and the external device 800 is detected, an operating system running on external device 800 may automatically execute the resident software application. For example, a Windows® operating system may be configured to check the contents of the non-volatile memory of the digital video camera 801 for an "autoplay.inf" file upon detecting a connection between the digital video camera 801 and the external device 800. The "autoplay.inf" file then directs the operating system to the resident software application, which is stored in the non-volatile memory of digital video camera 801. The operating system of the external device 800 then executes the resident software application.

Upon execution, the resident software application may check the external device 800 to determine if required software components are available, then install the software components in the external device 800 if the software components are not available. For example, the resident software application may determine if certain compression-decompression algorithms (codecs) are available on the external device 800. If the resident software application determines that the codecs are not available on the external device 800, the resident software application may then automatically install the codecs on the external device 800 without additional user intervention. In other embodiments, the resident software application may wait for verification from a user before installing the software components. The resident software application may also install other software components such as software libraries or application files. The resident software, in one embodiment, may also cause data to be written to memory in the external device 800 for tracking purposes. For instance, the resident software may add entries or keys to the registry of a computer running the Windows® operating system so that upon a subsequent connection to the same computer, the resident software application can simply check the registry entries or keys to determine which codecs or software components were previously installed. Additional description related to the operation of software in relation to a digital video camera is provided in copending and commonly assigned U.S. patent application Ser. Nos. 12/258,327 and 12/258,331, both filed on Oct. 24, 2008, the disclosures of which are hereby incorporated by reference in their entirety for all purposes.

Figure 9:
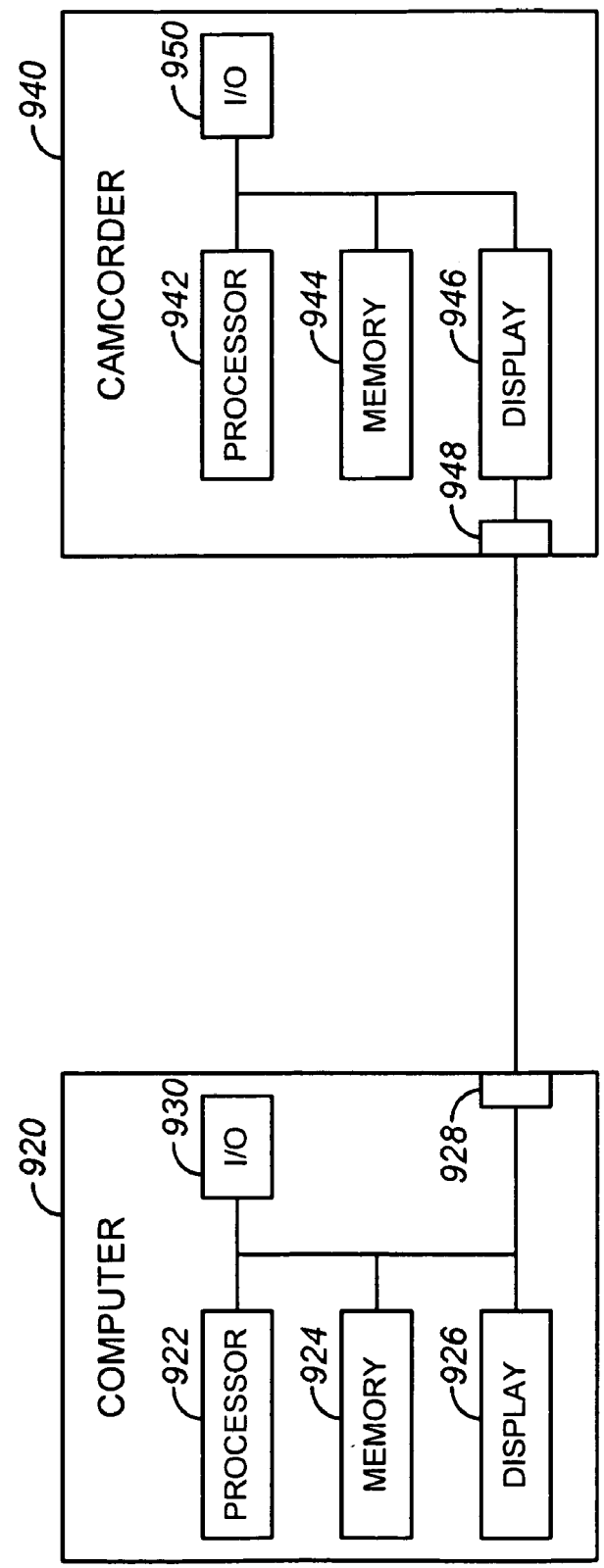
FIG. 9 is a simplified schematic diagram of a system for video footage management according to an embodiment of the present invention.

FIG. 9 is a simplified schematic diagram of a system for video footage management according to an embodiment of the present invention. The system includes a computer 920 including a processor 922, memory 924 (which may be internal, external, or a combination thereof), a display 926, a communication port 928, and an input/output (I/O) system 930. The system also includes camcorder 940, which includes a processor 942, internal memory 944, display 946, a communication port 948 (e.g., a USB port), and an input/output (I/O) system 950.

The internal memory 944 comprises either volatile memory, such as dynamic random access memory (DRAM), non-volatile memory, such as a hard disk drive or a flash memory module, or a combination of both volatile and non-volatile memory. The internal memory 944 stores the composite video files as well as firmware that is executed by the processor 942 to control the operations of the digital video camera 940. The internal memory 944 also stores one or more software drivers implemented as a set of program instructions configured to coordinate operations between the interface buttons includes as part of the input/output system 950 and the other components of the digital video camera 940, including the processor 942 as described in greater detail herein. For example, the program instructions that constitute the one or more drivers may be executed by the processor 942 to run video editing software suitable for the applications described herein.

A software application also resides within the memory 924 provided in the host computer 920. In one embodiment, the software application is an audio/video editing application that is stored in a non-volatile memory portion within the memory 924. When a connection between the digital video camera 940 and the host computer 920 is detected, an operating system stored within the memory 924 and executing on the host computer 920 is configured to automatically execute the software application, such as the FlipShare™ software package. For example, as discussed above, the operating system may be configured to check the contents of the non-volatile memory portion of the internal memory 944 for a file, such as an "autoplay.inf" file, that causes the software application to be automatically executed. In alternative embodiments, the software application may instead be executed by the operating system based on a request from the user to execute the software application.

In one embodiment, the software application, when executed by the operating system included in the host computer 920, is configured to produce a GUI (e.g., a GUI as illustrated in FIG. 1) on a display 926 associated with the computer system. As discussed in relation to FIG. 1, the GUI may present a user with graphical controls to allow the user to perform various video processing operations. Such video processing operations may include copying composite video files from the internal memory 944 to the memory 924 accessible to the host computer 920, playing composite video files, deleting composite video files from the internal memory 944, editing composite video files stored in the internal memory 944, merging two composite video files stored in the internal memory 944, attaching a composite video file to an email message, or uploading a composite video file to an online server. In particular, as discussed in relation to FIG. 2, the video processing operations may include capturing snapshots or still images from video footage.

Thus, memory 924 and/or internal memory 944, also referred to as storage subsystems, provide a computer-readable storage medium for storing the basic programming and data constructs that provide the functionality of the present invention. Software (programs, code modules, instructions), that when executed by either processor 922 or 942 provide the functionality of the present invention, may be stored in a storage subsystem. These software modules or instructions may be executed by one or more processors, such as processors 922 or 942 or other suitable processors. Storage subsystems 924 and 944 may comprise memory subsystems, file/disk storage subsystems, or other suitable memory systems.

Memory subsystems 924 and/or 944 may include a number of memories including a main random access memory (RAM) for storage of instructions and data during program execution and a read only memory (ROM) in which fixed instructions are stored. File storage subsystem provides persistent (non-volatile) storage for program and data files, and may include a hard disk drive, a floppy disk drive along with associated removable media, a Compact Disk Read Only Memory (CD-ROM) drive, flash memory, an optical drive, removable media cartridges, and other like storage media.

Aspects of the invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Figure 10:
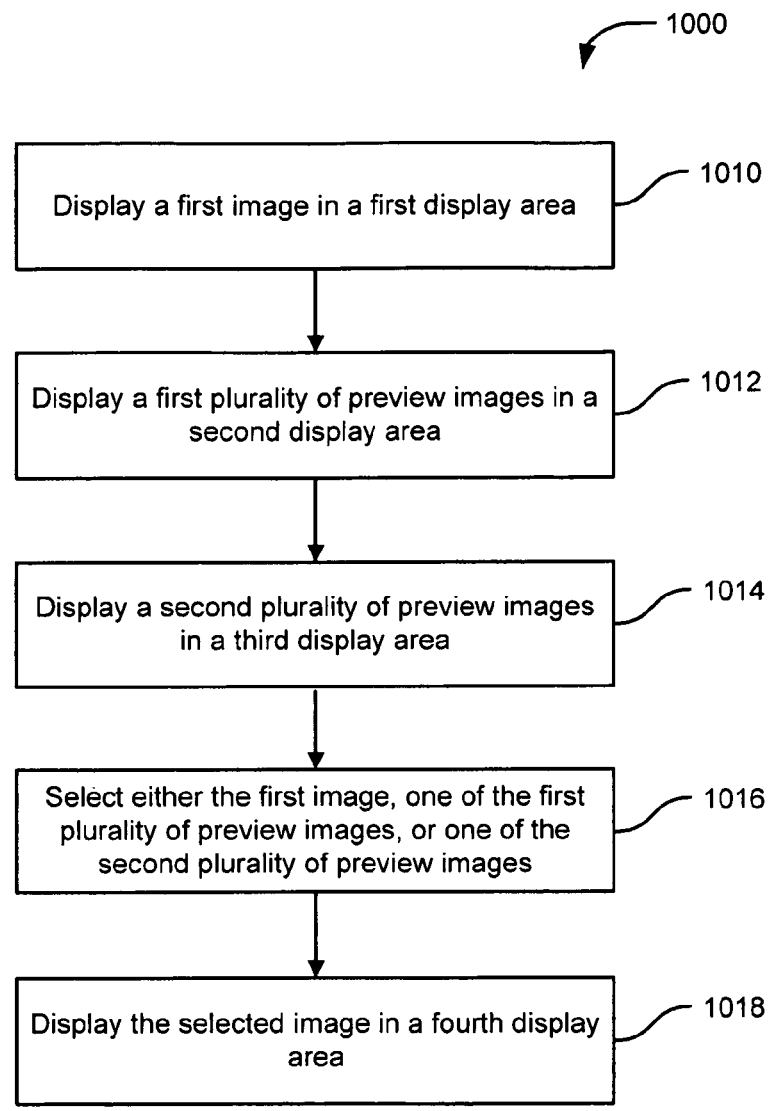
FIG. 10 is a simplified flowchart illustrating a method of capturing snapshots of video footage according to an embodiment of the present invention.

FIG. 10 is a simplified flowchart illustrating a method of capturing snapshots of video footage according to an embodiment of the present invention. The method provides one or more snapshots extracted from video footage. The method (1000) includes displaying a first image in a first display area (1010). The first image is associated with a first capture time. As discussed above, the capture time can be represented in terms of the time from the beginning of the video footage in hours, minutes, and seconds (e.g., 0:02:12) and a frame number (e.g., frame 10) within the second of video footage. Other methods of representing the capture time are also included within the scope of the present invention. The method also includes displaying a first plurality of preview images in a second display area (1012). The first plurality of preview images are associated with times prior to the first capture time. As shown in FIG. 2, the second display area is smaller than the first display area and provides room for the display of a predetermined number of preview images (e.g., six images).

As discussed in relation to FIG. 3, the preview images can be displayed using animation techniques. Thus, in an embodiment, displaying the first plurality of preview images includes displaying a first preview image and thereafter displaying a second preview images for which the capture time for the second preview image is prior to the capture time of the first preview image. In this embodiment, the animation precedes backwards in time for the images captured prior to the main image.

The method further includes displaying a second plurality of preview images in a third display area (1014). The second plurality of preview images are associated with times subsequent to the first capture time. As shown in FIG. 2, the third display area is smaller than the first display area and provides room for the display of a predetermined number of preview images (e.g., six images). Thus, embodiments of the present invention provide for display of a main image in the first display area and a number of preview images acquired at times prior to and after the main image.

Similar to the animation of the preview images captured before the main image, the preview images captured after the main image can also be displayed in an animated manner. Thus, in an embodiment, displaying the second plurality of preview images includes displaying a first preview image and thereafter displaying a second preview images for which the capture time for the second preview image is subsequent to the capture time of the first preview image. In this embodiment, the animation precedes forwards in time for the images captured after the main image.

The method additionally includes selecting at least one of the first image, one of the first plurality of preview images, or one of the second plurality of preview images (1016) and displaying the selected image in a fourth display area (1018). In some embodiments, a snapshot is selected by selecting a snapshot icon provided in the graphical user interface displayed on a computer. The selected image may be saved to a memory for use in other software applications, such as email. A user is able to hover over or select the selected image in order to display the selected image in the first display area. As an example, after the snapshot is selected and displayed in the fourth display area, the user can click on the snapshot image to display the snapshot as the main image and update the preview images based on the selected snapshot image.

In an embodiment, the time difference between the various preview images is equal to an inverse of the frame rate, enabling a user to view subsequent frames from the video footage. In other embodiments, the time difference between various preview images is equal but with a larger step size or conforms to a non-linear progression in which the time difference increases or decreases as a function of time. A user is able to position a cursor over one of the preview images and create a hover image in which the preview image is temporarily displayed in the first display area and the frame associated with the main image and the preview image is modified, for example, to a black border. In the persistent snapshot implementations, the one or more snapshots displayed in the fourth display area are snapshots that were captured in a previous video editing session.

It should be appreciated that the specific steps illustrated in FIG. 10 provide a particular method of capturing snapshots of video footage according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple substeps that may be performed in various sequences as appropriate to the individual step. Furthermore, additional steps may be added or removed depending on the particular applications. One of ordinary skill in the art would recognize many variations, modifications, and alternatives.

Figure 11:
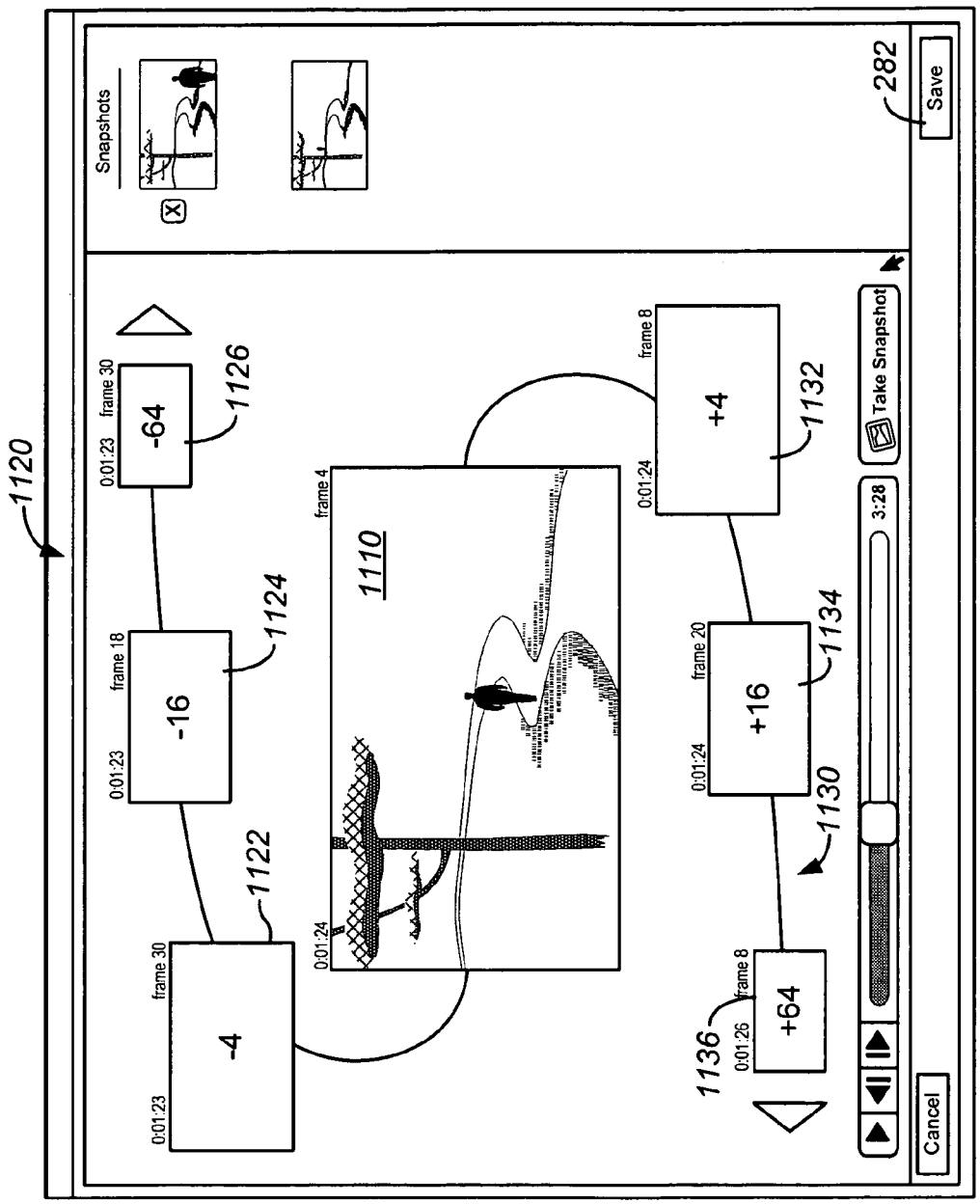
FIG. 11 is a simplified illustration of a graphical user interface for displaying video footage and snapshots according to another embodiment of the present invention.

FIG. 11 is a simplified illustration of a graphical user interface for displaying video footage and snapshots according to another embodiment of the present invention. In this embodiment, the arrangement of the main display area with linear preview areas above and below the main display area are modified to utilize a serpentine arrangement in which the main image is displayed in main display area 1110 and preview images captured prior to the main image are displayed in a serpentine set of images above the main image, and preview images captured subsequent to the main image are displayed in a serpentine set of images below the main image.

The preview images get smaller as they retreat and advance in time. Additionally, the time steps between preview images increases as a function of time. Referring to FIG. 11, the closest preview images (1122/1132) are images captured ±4 frames prior/subsequent to the main image. The next preview images (1124/1134) are images captured ±16 frames prior/subsequent to the main image for example, and the final preview images (1126/1136) are images captured ±64 frames prior/subsequent to the main image. By increasing the time gap between adjacent preview images, the user is able to review a larger portion of the video footage simultaneously. Although three preview images are displayed prior to and subsequent to the main image, this particular number is not required by the present invention. In other embodiments, a greater or lesser number of preview images are displayed as appropriate to the particular application. Additionally, although time gaps of 4, 16, and 64 frames are illustrated, the present invention is not limited to these particular time gaps and other suitable time gaps can be utilized as appropriate to the particular application. The smaller size of the images as a function of time represents the increasing time gap between the main image and the particular preview image. At the same time, the preview images temporally adjacent to the main image are displayed using a size that is almost as large as the main image, allowing for easy comparison with other images.

Some embodiments of the present invention include a slider (not illustrated) to control the speed at which the video footage is playing. By adjusting the slider, a user is able to increase or decrease the playback speed, moving quickly through video of lesser interest and at a reduced pace through more interesting video footage.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A display device, comprising:
one or more computer processors;
a memory, containing a program, which when executed by the one or more computer processors, performs an operation to output a graphical user interface to a display, the operation comprising:
displaying a first image from a video stream in a first display area of the display, the first image having an associated capture time;
displaying a first plurality of images from the video stream in a second display area of the display wherein each image of the first plurality of images is associated with a corresponding capture time prior to the capture time of the first image;
displaying a second plurality of images from the video stream in a third display area of the display, wherein each image of the second plurality of images is associated with a corresponding capture time subsequent to the capture time of the first image; and displaying a user input element operable to capture the first image as a snapshot image, the snapshot image being a still image of the first image in the first display area, the snapshot image being displayed in a fourth display area of the display.

2. The display device of claim 1, wherein the second display area is positioned above the first display area.

3. The display device of claim 2, wherein the third display area is positioned below the first display area.

4. The display device of claim 3, wherein the one or more snapshot images comprise a stack of images arrayed in a temporal order.

5. The display device of claim 4, further comprising a user selection box, wherein a snapshot image is displayed in the fourth display area in response to actuation of the user selection box.

6. The display device of claim 5, wherein the fourth display area is positioned horizontally to the side of the first display area.

7. The display device of claim 1, further comprising a first user input element comprising a scrollbar.

8. The display device of claim 7 wherein the scrollbar comprises a scroll box and a timestamp associated with a position of the scroll box.

9. The display device of claim 1, further comprising:
programmatically scanning and capturing one or more snapshot images corresponding to respective images selected from the video stream based on one or more image attributes; and
displaying the one or more snapshot images in the fourth display area of the display.

10. The display device of claim 9, wherein the one or more image attributes are selected from at least one of: (i) user input; (ii) a computed quality metric of the one or more respective images of the video stream; and (iii) an audio element from the video stream.

11. The display device of claim 10, wherein the quality metric is computed based on a plurality of attributes of the respective images of the video stream, the plurality of attributes comprising: (i) an image sharpness; (ii) an image brightness; (iii) an image contrast; (iv) an image color; (v) a presence of at least one human face; and (vi) a number of open human eyes.

12. A computer-implemented method for generating graphical user interface of a display device, the method comprising:
displaying a first image from a video stream in a first display area of a display, the first image having an associated capture time;
displaying a first plurality of images from the video stream in a second display area of the display, wherein each image of the first plurality of images is associated with a corresponding capture time prior to the capture time of the first image;
displaying a second plurality of images comprising a plurality of images from the video stream in a third display area of the display, wherein each image of the second plurality of images is associated with a corresponding capture time subsequent to the capture time;
displaying a user input element operable to capture the first image as a snapshot image, the snapshot image being a still image of the first image in the first display area, the snapshot image being displayed in a fourth display area of the display;
programmatically scanning and capturing, based on at least one image attribute and by operation of one or more computer processors, one or more snapshot images corresponding to respective images selected from the video stream; and
displaying the one or more captured snapshot images in the fourth display area of the display.

13. The computer-implemented method of claim 12 wherein the first side is a top side of the first display area and the second side is a bottom side of the first display area.

14. The computer-implemented method of claim 13 wherein the fourth display area is adjacent to a third side of the first display area.

15. The computer-implemented method of claim 14 further comprising a user input button configured to display the first image in the fourth display area in response to actuation of the user input button.

16. The computer-implemented method of claim 12 wherein the plurality of sequential images associated with capture times subsequent to the capture time are characterized by decreasing image size as a function of capture time.

17. The computer-implemented method of claim 12, wherein the one image attributes are selected from at least one of: (i) user input; (ii) a computed quality metric of the one or more respective images of the video stream; and (iii) an audio element from the video stream.

18. The computer-implemented method of claim 17, wherein the quality metric is computed based on a plurality of attributes of the respective images of the video stream, the plurality of attributes comprising: (i) an image sharpness; (ii) an image brightness; (iii) an image contrast; (iv) an image color; (v) a presence of at least one human face; and (vi) a number of open human eyes.

19. A computer program product to generate a graphical user interface on a display device, comprising:
a computer-readable storage medium having computer-readable program code embodied therewith, the computer-readable program code comprising:
computer-readable program code configured to display a first image from a video stream in a first display area of a display, the first image having an associated capture time;
computer-readable program code configured to display a first plurality of images from the video stream in a second display area of the display, wherein each image of the first plurality of images is associated with a corresponding capture time prior to the capture time of the first image;
computer-readable program code configured to display a second plurality of images comprising a plurality of images from the video stream in a third display area of the display, wherein each image of the second plurality of images is associated with a corresponding capture time subsequent to the capture time;
computer-readable program code configured to display a user input element operable to capture the first image as a snapshot image, the snapshot image being a still image of the first image in the first display area, the snapshot image being displayed in a fourth display area of the display;
computer-readable program code configured to programmatically scan and capture, based on at least one image attribute, one or more snapshot images corresponding to respective images selected from the video stream; and
computer-readable program code configured to display the one or more captured snapshot images in the fourth display area of the display.

20. The computer program product of claim 19 wherein the second display area is positioned above the first display area and the third display area is positioned below the first display area.

21. The computer program product of claim 19 wherein the one or more snapshot images comprise a stack of images arrayed in a temporal order.

22. The computer program product of claim 19 wherein the fourth display area is positioned horizontally to the side of the first display area.

23. The computer program product of claim 19, wherein the one or more image attributes are selected from at least one of: (i) user input; (ii) a computed quality metric of the one or more respective images of the video stream; and (iii) an audio element from the video stream.

24. The computer program product of claim 23, wherein the quality metric is computed based on a plurality of attributes of the respective images of the video stream, the plurality of attributes comprising: (i) an image sharpness; (ii) an image brightness; (iii) an image contrast; (iv) an image color; (v) a presence of at least one human face; and (vi) a number of open human eyes.

* * * * *